(12) United States Patent
Brees (10) Patent No.: US 7,896,144 B2
(45) Date of Patent: Mar. 1, 2011

(54) RATCHET ONE-WAY CLUTCH WITH VIBRATION DAMPENING

(75) Inventor: William Brees, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 605 days.

(21) Appl. No.: 11/726,880

(22) Filed: Mar. 23, 2007

(65) Prior Publication Data

US 2007/0220876 A1    Sep. 27, 2007

Related U.S. Application Data

(60) Provisional application No. 60/785,684, filed on Mar. 24, 2006.

(51) Int. Cl.
*F16D 41/18* (2006.01)
*F16D 33/00* (2006.01)
(52) U.S. Cl. ............ 192/46; 60/338; 60/345; 192/55.61; 192/69.71; 192/212
(58) Field of Classification Search ............... 192/69.71, 192/55.61; 60/338, 345
See application file for complete search history.

(56) References Cited

U.S. PATENT DOCUMENTS

| 2,075,078 | A | * | 3/1937 | Allen | .................. 192/55.61 |
| 5,070,978 | A | | 12/1991 | Pires | |
| 5,597,057 | A | | 1/1997 | Ruth et al. | |
| 5,718,114 | A | | 2/1998 | Murata et al. | |
| 5,852,932 | A | | 12/1998 | Matsumoto | |
| 5,853,073 | A | | 12/1998 | Costin | |
| 5,871,071 | A | * | 2/1999 | Sink | ................ 192/46 |
| 6,422,962 | B1 | | 7/2002 | Lehtovaara et al. | |
| 6,571,926 | B2 | | 6/2003 | Pawley | |
| 6,575,275 | B2 | | 6/2003 | Muramatsu et al. | |
| 6,619,036 | B2 | * | 9/2003 | Kawamoto et al. | ........... 60/345 |
| 6,830,138 | B2 | | 12/2004 | Muramatsu | |
| 6,907,971 | B2 | * | 6/2005 | Demir et al. | ................ 192/46 |
| 6,933,641 | B2 | | 8/2005 | Muramatsu et al. | |
| 2001/0027649 | A1 | * | 10/2001 | Reinhart et al. | ............... 60/345 |
| 2003/0146063 | A1 | | 8/2003 | Yamada | |
| 2007/0045076 | A1 | | 3/2007 | Brees et al. | |
| 2007/0137977 | A1 | | 6/2007 | Peri et al. | |
| 2007/0140841 | A1 | | 6/2007 | George et al. | |

FOREIGN PATENT DOCUMENTS

EP    0811788    12/1997

OTHER PUBLICATIONS

U.S. Appl. No. 11/728,068 Hemphill et al., filed Mar. 23, 2007.

* cited by examiner

*Primary Examiner* — Rodney H Bonck
(74) *Attorney, Agent, or Firm* — Simpson & Simpson, PLLC (57) ABSTRACT

The present invention broadly comprises a stator and one-way clutch assembly including a segment of a stator, a one-way clutch engaged with the segment, and at least one elastically deformable element engaged with the segment and the clutch and arranged to dampen transfer of torque from the stator to the clutch. In some aspects, the clutch includes a first plate and the deformable element is engaged with the segment and the plate. The segment urges the deformable element against the first plate. The first plate is arranged to rotate in response to the urging. The segment and the first plate are arranged to rotationally lock. The first plate and a second plate, connected to a clutch hub, rotationally lock in response to the urging, and the segment and the first plate are arranged to rotationally lock following the locking of the first and second plates.

19 Claims, 9 Drawing Sheets

RATCHET ONE-WAY CLUTCH WITH VIBRATION DAMPENING

CROSS-REFERENCE TO RELATED APPLICATIONS

This application claims the benefit under 35 U.S.C. §119(e) of U.S. Provisional Application No. 60/785,684 filed Mar. 24, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a stator and one-way clutch assembly, with vibration dampening, in a stator. The assembly provides a dampening means between the stator and the clutch to minimize impact, noise, and vibration associated with the transition from free-wheel mode to locked mode in the stator.

BACKGROUND OF THE INVENTION

One-way clutches are used in stators to rotationally disengage the blades of the stator from the shaft of the stator during a free-wheel mode and to rotationally lock the blades and the stator shaft during a locked mode. During the transition from the free-wheel mode to the locked mode, the stator changes from spinning (free-wheeling) to carrying torque. To lock the clutch, various components of the clutch are brought into contact. The impact associated with the contact can generate undesirable noise and vibration. The magnitude of the impact and hence the magnitude of the noise and vibration is related to the lash associated with the movement of the components during the transition. It is known to include counteracting components within the clutch to minimize the lash. These components entail a high degree of precision to function properly. Unfortunately, this degree of precision can be much greater than or even incompatible with the precision associated with the remaining components in the clutch. For example, stamped components in a clutch can greatly reduce the cost and complexity of the clutch. However, it may be difficult or even impossible to incorporate the counteracting components noted above using stamped components.

Thus, there is a long-felt need for a means of reducing noise and vibration in a one-way stator clutch while simultaneously enabling the use of more cost-effective processes, configurations, and components.

BRIEF SUMMARY OF THE INVENTION

The present invention broadly comprises a stator and one-way clutch assembly including a segment of a stator, a one-way clutch arranged to engage the segment, and at least one elastically deformable element engaged with the segment and the clutch and arranged to dampen transfer of torque from the stator to the clutch. In some aspects, the clutch includes a first plate and the at least one elastically deformable element is engaged with the segment and the first plate. The segment is rotatable to urge the at least one elastically deformable element against the first plate. The at least one elastically deformable element is deformable in response to the urging. The first plate is arranged to rotate in response to the urging. The segment and the first plate are arranged to rotationally lock in the direction.

In some aspects, the segment is arranged to rotate at a first rate during the urging, the first plate is arranged to rotate at a second rate during the urging, and the first rate is greater than the second rate. In some aspects, the at least one elastically deformable element is arranged to be in a substantially constant state of deformation during the locking. The clutch includes a hub and a second plate connected to the hub, the first and second plates are operatively arranged to rotationally lock in response to the urging, and the segment and the first plate are arranged to rotationally lock following the locking of the first and second plates. In some aspects, the first plate is axially moveable.

In some aspects, the first plate comprises at least one first protrusion, the second plate comprises at least one first receiving structure, and the at least one first protrusion and the at least one first receiving structure are arranged to lockingly engage. In some aspects, the second plate comprises at least one second protrusion, the first plate comprises at least one second receiving structure, and the at least one second protrusion and the at least one second receiving structure are arranged to lockingly engage.

In some aspects, the segment is arranged to transfer torque to the at least one elastically deformable element and the at least one elastically deformable element is arranged to transfer at least a portion of the torque to the first plate. In some aspects the at least one elastically deformable element is arranged to transfer substantially all of the torque to the first plate. In some aspects, the segment retains the at least one elastically deformable element or the first plate retains the at least one elastically deformable element. In some aspects, the segment and the first and second plates are formed by stamping. In some aspects, the at least one elastically deformable element includes a component selected from the group consisting of a spring and a rubber cylinder.

The present invention also broadly comprises a stator and one-way clutch assembly including a segment of a stator, a portion of a one-way clutch, and at least one elastically deformable element. The portion is engaged with the segment. The element is engaged with the segment and the portion and is arranged to dampen vibration associated with a rotational locking of the stator and clutch.

The present invention further broadly comprises a stator and one-way clutch assembly including a segment for a stator, a first portion of a one-way clutch, a second portion of the one-way clutch, and at least one elastically deformable element engaged with the segment and the first portion. The second portion is connected to a hub for the stator. The segment is rotatable to urge the at least one elastically deformable element against the first portion and the at least one elastically deformable element is arranged to deform in response to the urging. The first portion is arranged to rotate in response to the urging, the first and second portions are operatively arranged to rotationally lock in response to the urging, and the segment and the first plate are arranged to rotationally lock following the locking of the first and second plates. The at least one elastically deformable element is arranged to absorb a portion of the energy associated with the locking of the first and second plates.

It is a general object of the present invention to provide a one-way clutch in a stator that produces minimal vibration and noise when shifting to a locked mode.

It is another object of the present invention to provide a one-way clutch in a stator with dampening between components used to transfer torque during a locked mode.

It is a further object of the present invention to use stamped parts in a stator and a one-way clutch to provide an assembly that produces minimal vibration and noise when the stator changes to a locked mode.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
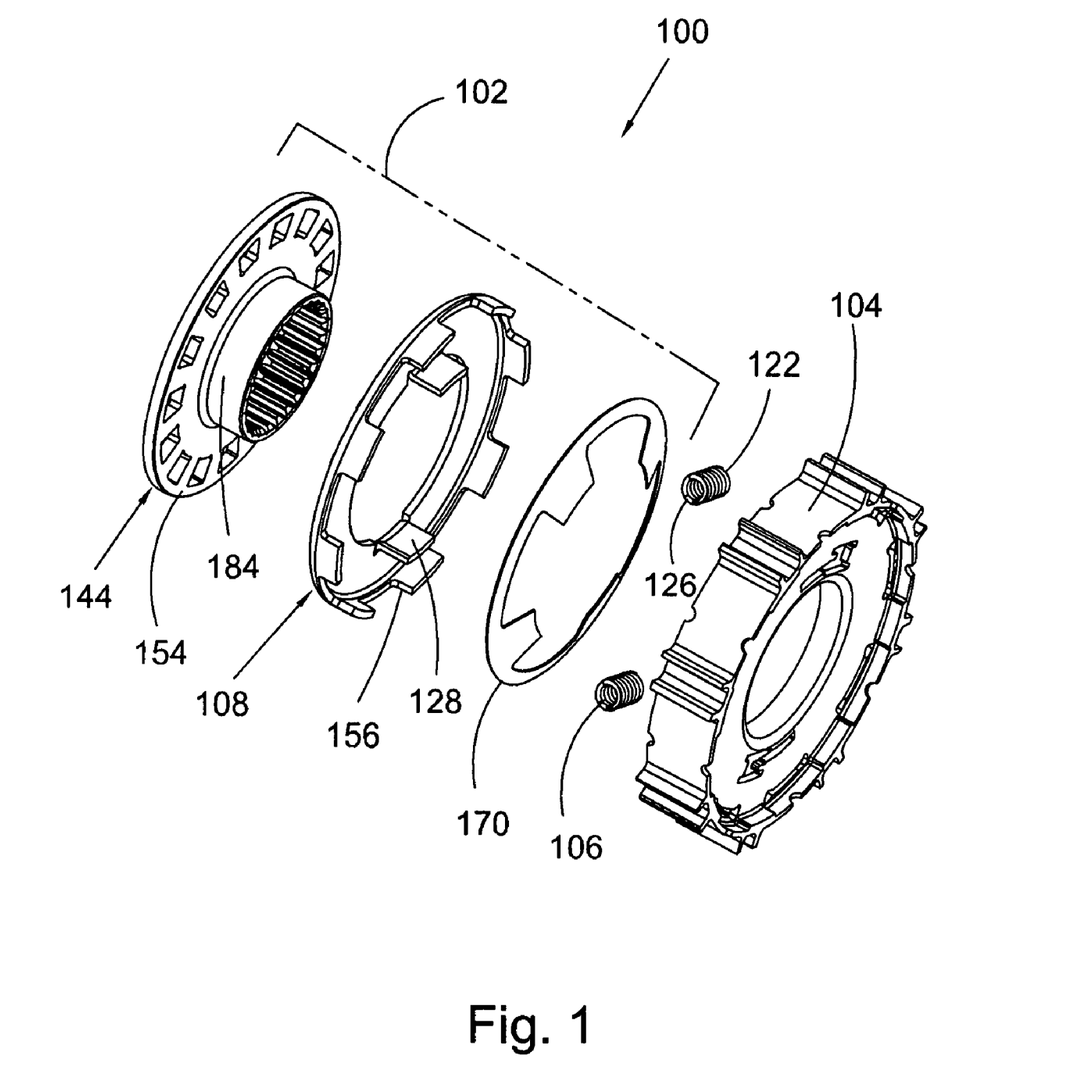
FIG. 1 is a front exploded view of a present invention stator and one-way clutch assembly.

FIG. 1 is a front exploded view of stator and one-way clutch assembly 100.

Figure 2:
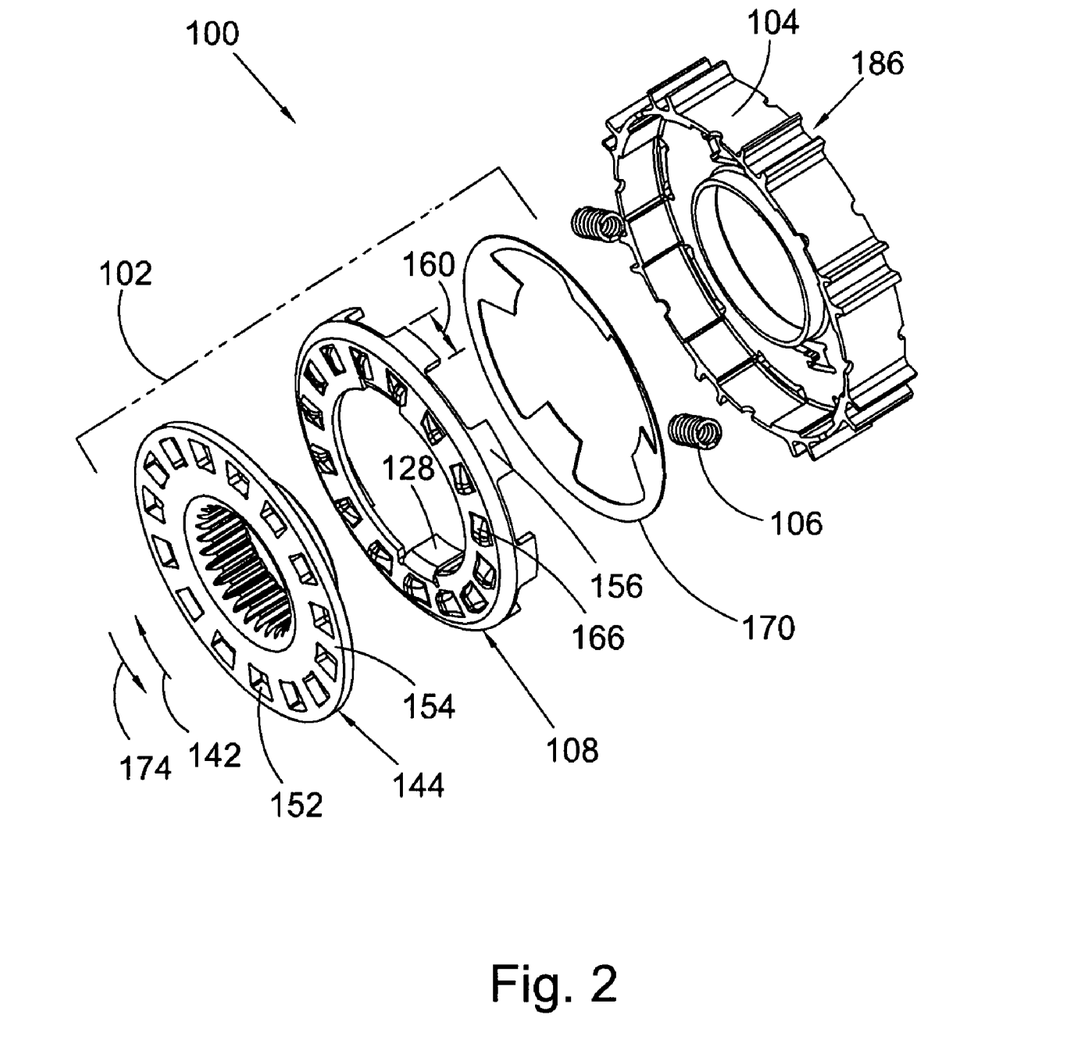
FIG. 2 is a back exploded view of the stator and one-way clutch assembly shown in FIG. 1.

FIG. 2 is a back exploded view of stator and one-way clutch assembly 100. The following should be viewed in light of FIGS. 1 and 2. Front refers to the side facing an engine when a torque converter housing the stator is installed in a vehicle. Back refers to the side facing the transmission in the vehicle. It should be understood that these terms are relative and that the meanings above can be reversed. In general, a present invention stator and one-way clutch assembly includes a portion or segment of a stator and a portion of a one-way clutch linked by at least one elastically deformable element. For example, assembly 100 includes one-way clutch 102, housing or plate 104 (part of a stator, not shown, in which the clutch is disposed), and at least one elastically deformable element 106. Clutch 102 is arranged to engage the stator as further described infra. The deformable elements are engaged with the stator, in particular, housing 104, and the clutch, in particular plate 108, and are arranged to dampen transfer of torque or energy from the stator to the clutch. In particular, the elements are arranged to dampen vibration associated with the transition of the stator from the free-wheel mode to the locked mode. Alternatively stated, the elements absorb portions of the torque or energy associated with the shift to a locked mode and with the contact between the stator and clutch inherent in the shift. Also, the elements reduce the relative velocity associated with the movement of the stator and clutch portions during the locked mode.

Any means known in the art can be used for elements 106, including, but not limited to, springs and cylinders made of compressible materials such as rubber. In FIGS. 1 and 2, elements 106 are springs. It should be understood that the present invention is not limited to the number, size, shape, or configuration of elements 106 shown, and that other numbers, sizes, shapes, or configurations of elements 106 are included within the spirit and scope of the invention as claimed.

Figure 3:
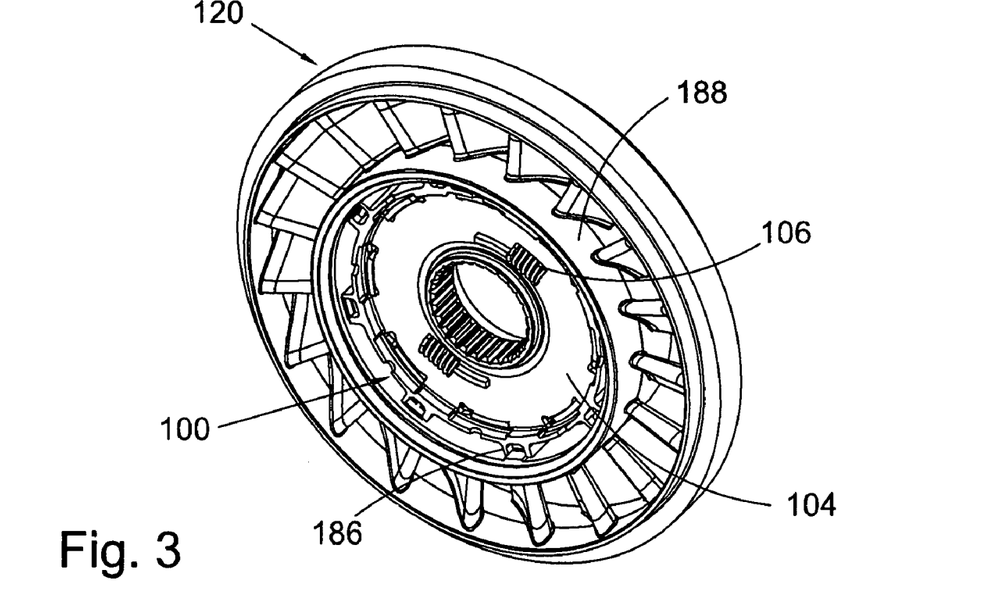
FIG. 3 is a front perspective view of a stator with a present invention stator and one-way clutch assembly.

FIG. 3 is a front perspective view of stator 120 with assembly 100.

Figure 4:
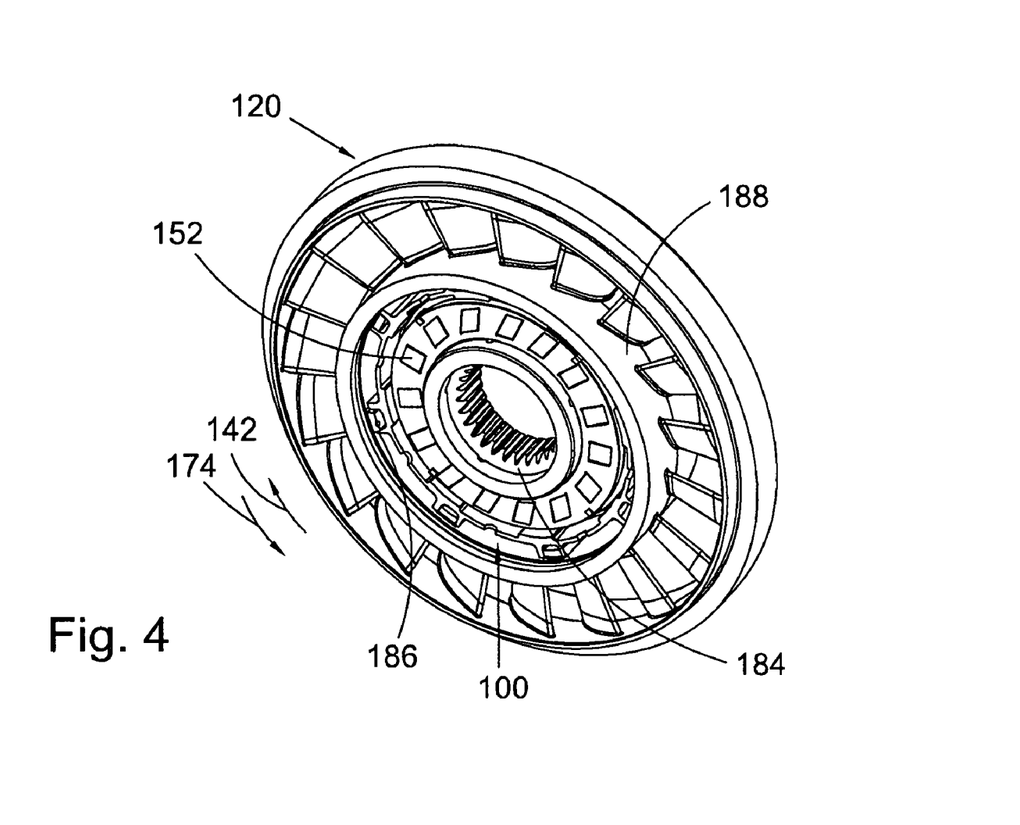
FIG. 4 is a back perspective view of the stator and present invention stator and one-way clutch assembly shown in FIG. 3.

FIG. 4 is a back perspective view of stator 120 with assembly 100.

Figure 5:
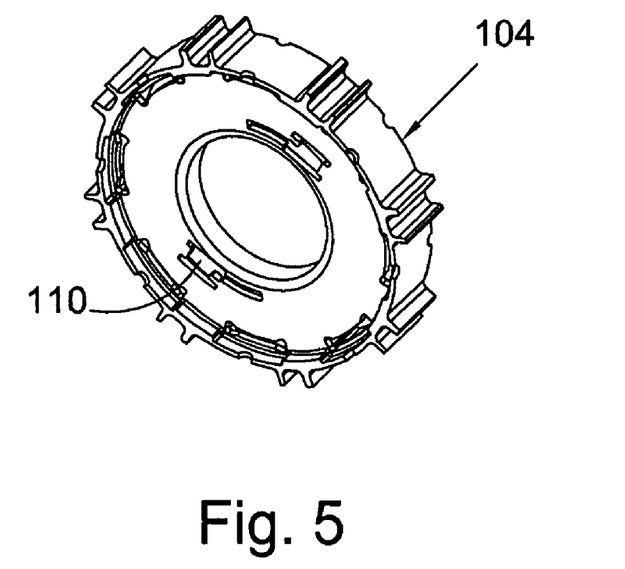
FIG. 5 is a front perspective view of the housing for the present invention stator and one-way clutch assembly shown in FIG. 1.

FIG. 5 is a front perspective view of plate 104 in stator 120.

Figure 6:
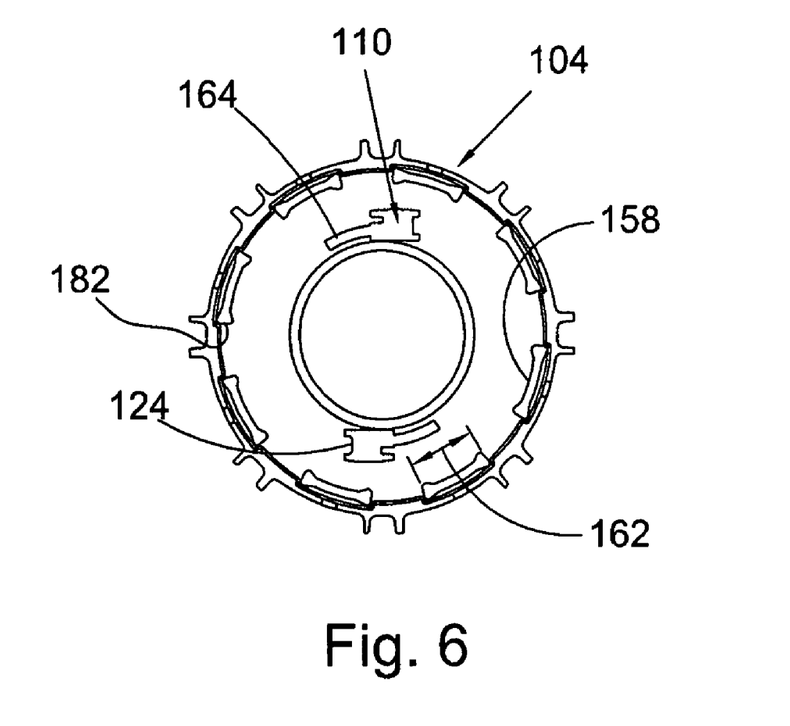
FIG. 6 is a front view of the housing shown in FIG. 5.

FIG. 6 is a front view of plate 104. The following should be viewed in light of FIGS. 1 through 6. Elements 106 are engaged with housing 104 and plate 108, which is part of clutch 102. Specifically, elements 106 are retained in openings 110 of plate 104. Ends 122 of the elements are engaged with ends 124 of the openings and ends 126 of the elements are engaged with tab or extension 128 of plate 108. It should be understood that the interface of elements 106 with the stator and clutch is not limited to the configuration shown. For example, in some aspects (not shown), elements 106 are retained in plate 108.

Figure 7:
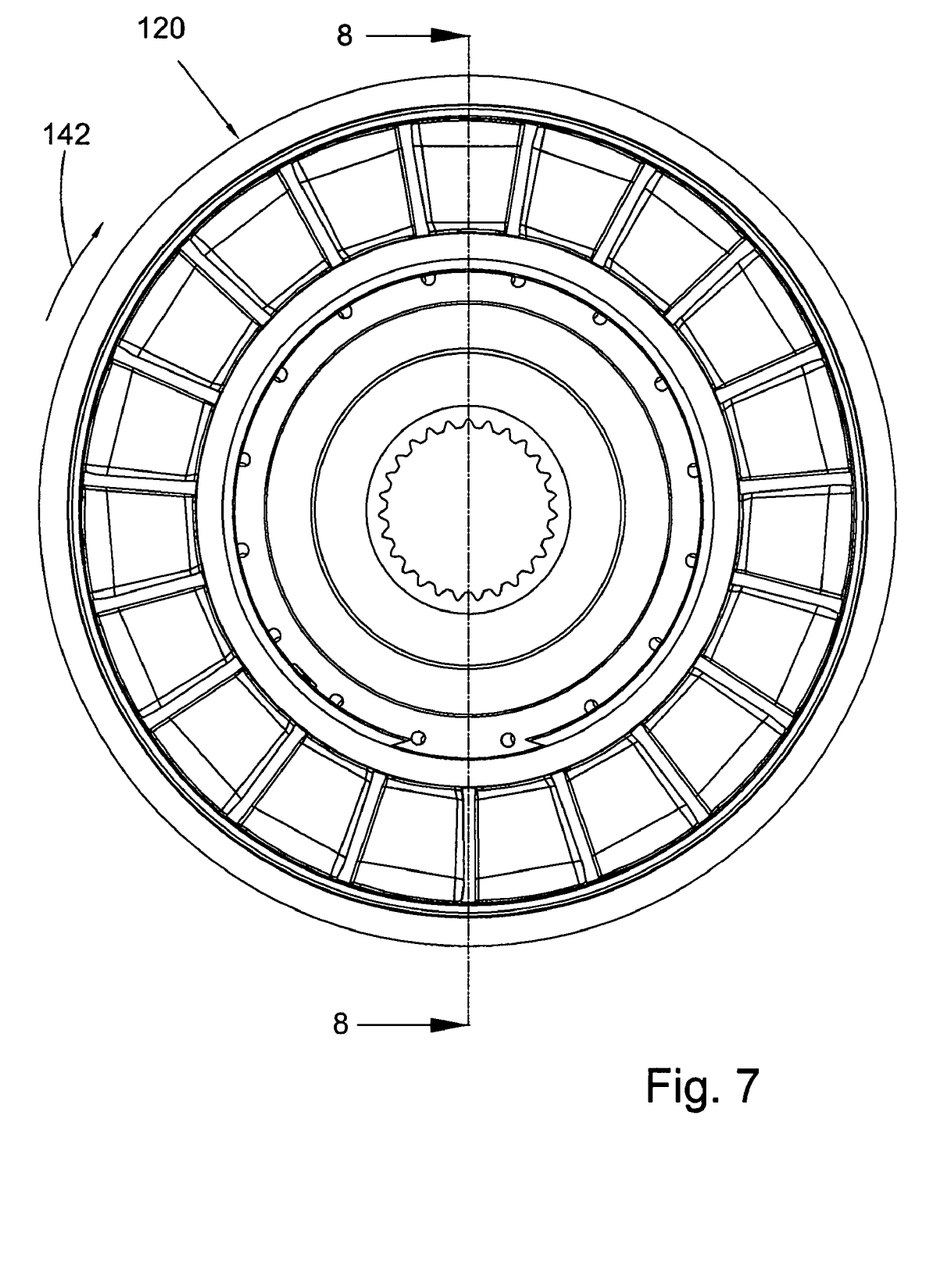
FIG. 7 is a back view of the stator in FIG. 3.

FIG. 7 is a back view of stator 120.

Figure 8:
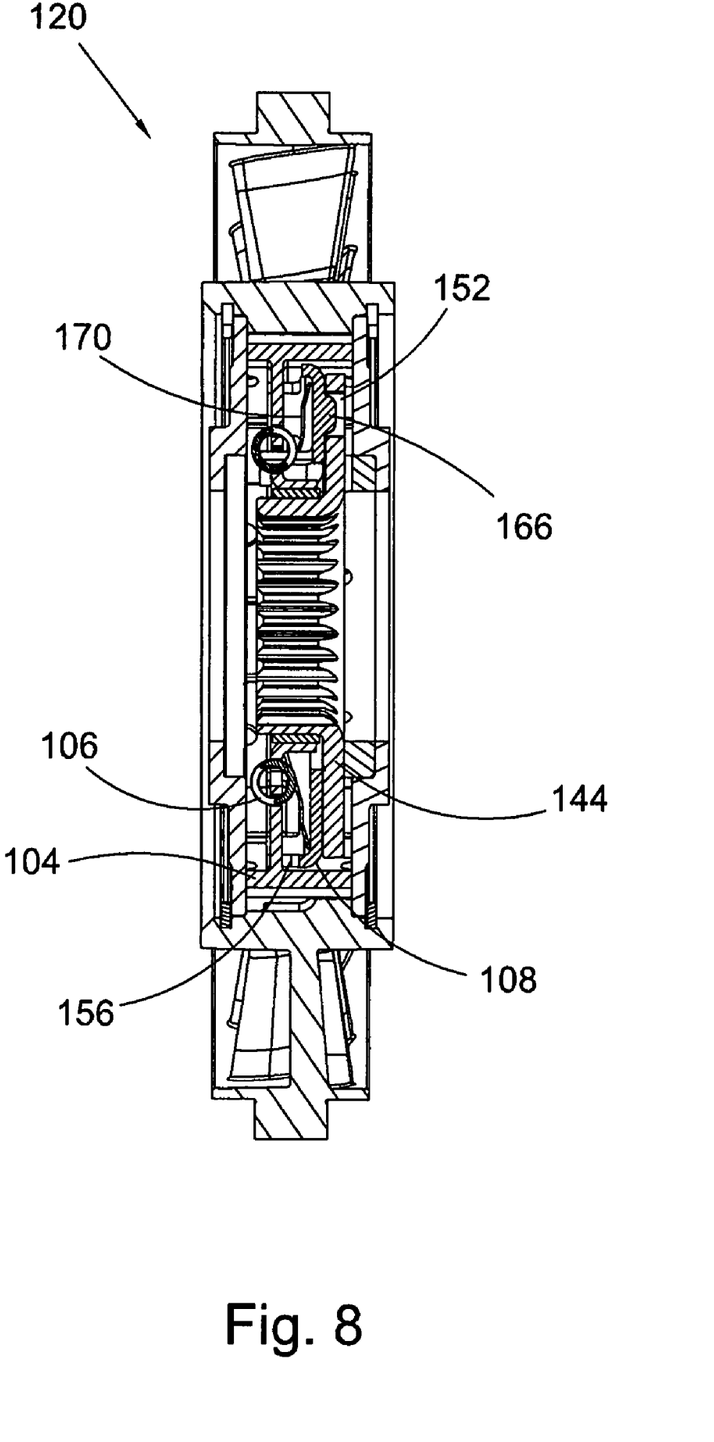
FIG. 8 is a cross-sectional view of the stator shown in FIG. 3 along line 8-8 in FIG. 7.

FIG. 8 is a cross-sectional view of stator 120 along line 8-8 in FIG. 7. The following should be viewed in light of FIGS. 1 through 8. Hub 144 is non-rotatably connected to a shaft (not shown) for stator 120. Extensions 156 of plate 108 are axially placed through openings 158 in housing 104. Width 160 of extensions 156 is less than width 162 of openings 158, such that plate 108 is able to move rotationally with respect to housing 104 when the extensions are disposed in openings 158. Extensions 128 extend axially through openings 164 in plate 104.

For rotation of stator 120 in a predetermined direction, the clutch is arranged to operate in a locked mode, for example, rotation in direction 142 is associated with operation of the stator in a locked mode. As the stator enters the locked mode, the stator begins to carry torque and housing 104 begins to rotate in direction 142. The stator and the clutch are rotationally connected via tabs 128 and elements 106. For example, the rotation of plate 104 in direction 142 causes the plate to urge element 106 against plate 108, in particular, against tab 128. In some aspects, plate 108 is arranged and configured such that the inertia associated with the plate in the free-wheel mode causes the element to at least partially deform as the element is urged against plate 108. For example, as ends 124 of the opening push against the springs, and the inertia of plate 108 resists the movement of ends 126, the element begins to compress. In some aspects, the resistance of element 106 is approximately 5 N/m.

As elements 106 continue to elastically deform or compress (be urged in direction 142 by housing 104), torque or energy from housing 104 is partially transferred through elements 106 to plate 108 and plates 108 begin to rotate in direction 142 in response to the urging. Alternately stated, as elements 106 are compressing, housing 104 is rotating at a first rate, plate 108 is rotating at a second rate, and the first rate is greater than the second rate.

The locking mechanism in clutch 102, for example, the configuration of plate 108 and hub 144, can be formed by any means known in the art. In addition, in some aspects, at least portions of an axially engaging and disengaging one-way clutch mechanism for a torque converter as shown in commonly assigned U.S. patent application Ser. No. 11/480,815, titled "STATOR HAVING AN AXIALLY ENGAGING AND DISENGAGING ONE-WAY CLUTCH MECHANISM FOR A TORQUE CONVERTER," inventors Brees et al., filed Jul. 3, 2006, is used. In FIGS. 1 through 8, the locking mechanism includes protrusions 166 on plate 108 and receiving structures in hub 144. In some aspects, the protrusions are ramps and the receiving structures are openings 152. In some aspects (not shown), the receiving structures are indentations. Spring 170 axially reacts against plate 104 to urge plate 108 axially against hub 144. Thus, plate 108 is axially moveable. The axial mobility of plate 108 is facilitated by the interplay of extensions 156 in openings 158.

When stator 120 rotates in direction 174 (free wheel), the ramps slide across hub 144 without lockingly engaging the openings, for example, due to the slope in the ramps. When stator 120 rotates in direction 142 (locked mode), the ramps engage the openings, rotationally locking plate 108 and hub 144.

Figure 9:
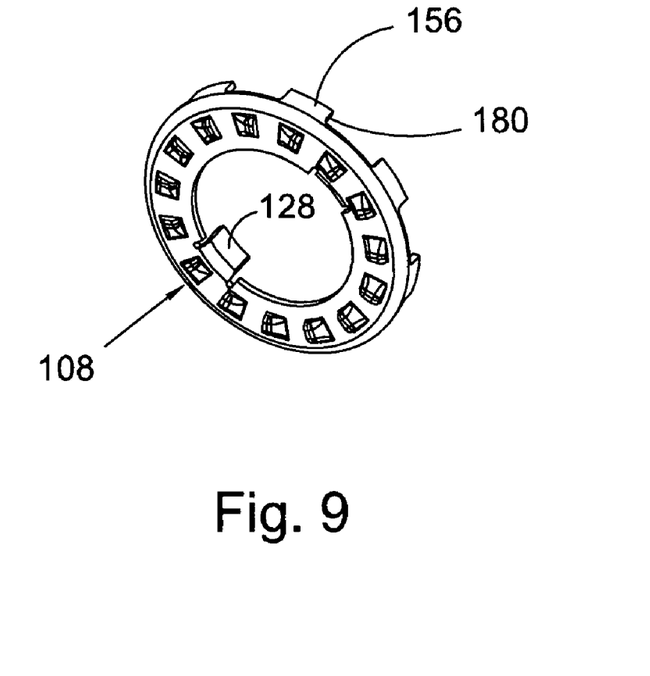
FIG. 9 is a back perspective view of a plate in the present invention stator and one-way clutch assembly shown in FIG. 1.

FIG. 9 is a back perspective view of plate 108 in clutch 102.

Figure 10:
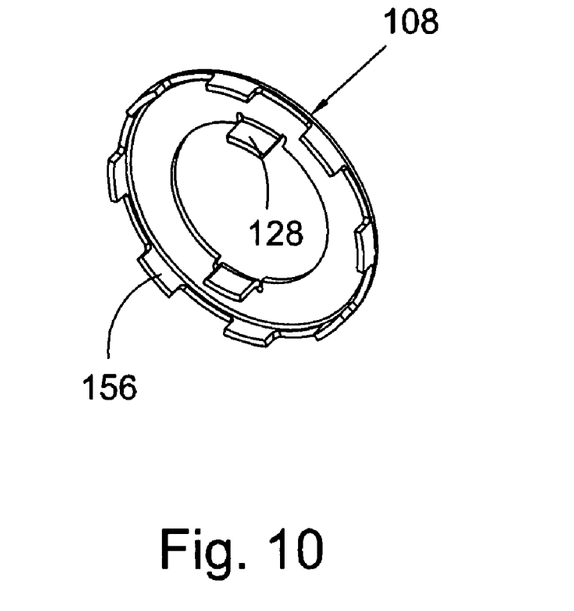
FIG. 10 is a front perspective view of the plate shown in FIG. 9.

FIG. 10 is a front perspective view of plate 108 in clutch 102. The following should be viewed in light of FIGS. 1 through 10. As described supra, in the initial stages of the change from the free-wheeling to the locked mode, plate 104 urges elements 106 against tabs 128. As the inertia of plate 108 is overcome by the torque transferring from housing 104 via elements 106, plate 108 rotates in direction 142 until protrusions 166 slip into and rotationally lock with openings 152. Advantageously, due to the relatively low inertia of plate 108 in the free-wheeling mode, only a relatively small amount of energy must be transmitted from elements 106 to plate 108 to move plate 108 into engagement with hub 144. As a result, there is nominal impact, vibration, and noise when the plates lock.

Plate 104 and elements 106 continue to rotate in direction 142, however, now plate 108 is rotationally locked with hub 144, which is non-rotatably connected to the stator shaft. That is, plate 108 is no longer able to rotate in direction 142. As a result, the elements compress until edges 180 of tabs 156 contact edges 182 of openings 158 in housing 104. At this point, housing 104 and stator 120 rotationally lock with the stator shaft through the connection of plate 108 with hub 144. Advantageously, the impact of edges 180 and 182 is dampened by the compressive action of elements 106, such that the vibration and noise associated with the impact is greatly diminished.

During locked mode, elements 106 are in a substantially constant state of deformation. That is, the elements do not compress further. In FIGS. 1 through 10, the constant state of deformation is due to direct contact between edges 180 and 182. In some aspects (not shown) and described infra, the constant deformation is due to the elements being fully compressed or attaining an equilibrium in which the resistance of the springs is greater than the torque transmitted by the portion of the stator, interfaced with the clutch, in the locked mode direction.

Plates 104 and 108 and hub 144 can be formed by any means known in the art. In some aspects, the plates and hub are stamped. In some aspects, flange 154 is a separate element joined to segment 184 by any means known in the art. In some aspects, flange 154 is stamped. Housing 104 can be configured for connection to the remainder of stator 120 by any means known in the art. For example, protrusions 186 are configured to link with ring 188 of the stator. In some aspects (not shown), housing 104 is integral to the stator, for example, as described in the commonly assigned U.S. Provisional Patent Application No. 60/785,790 titled "STATOR AND ONE-WAY CLUTCH ASSEMBLY FOR A TORQUE CONVERTER," inventors Hemphill et al., filed the same day as the present invention.

It should be understood that the present invention is not limited to the configurations shown in the figures. In some aspects (not shown), elastically deformable elements are connected to a component of a stator and to a rotating plate in a one-way clutch. The component and plate can be similar to housing 104 and plate 108, respectively. However, instead of operating with the component and plate coming into direct contact in the locked mode, for example, as described supra regarding edges 180 and 182, the component and plate remain separated by the deformable elements. For example, during the initial stages of the transition from free wheeling to locked mode, the component urges the elements against the plate and the plate rotates and eventually locks as described supra for plates 108 and hub 144. As the plate encounters the resistance of the stator shaft, the elements compress until they reach an equilibrium point or are completely compressed between the component and the plate. At this point, the elements are substantially, or functionally, rigid and the component and plate are rotationally locked. In the case of the equilibrium point, the strength of the elements is greater than the torque transmitted by the component and the elements only partially compress. Advantageously, this configuration eliminates impact between the component and plate and the vibration and noise associated with such impact. If the strength of the elements is less than the torque transmitted by the component, the elements fully compress. Advantageously, the impact is dampened by the compressive action of the elements, such that the vibration and noise associated with the impact is greatly diminished. That is, the elements slow down the relative velocity of the component and the plate.

Figure 11:
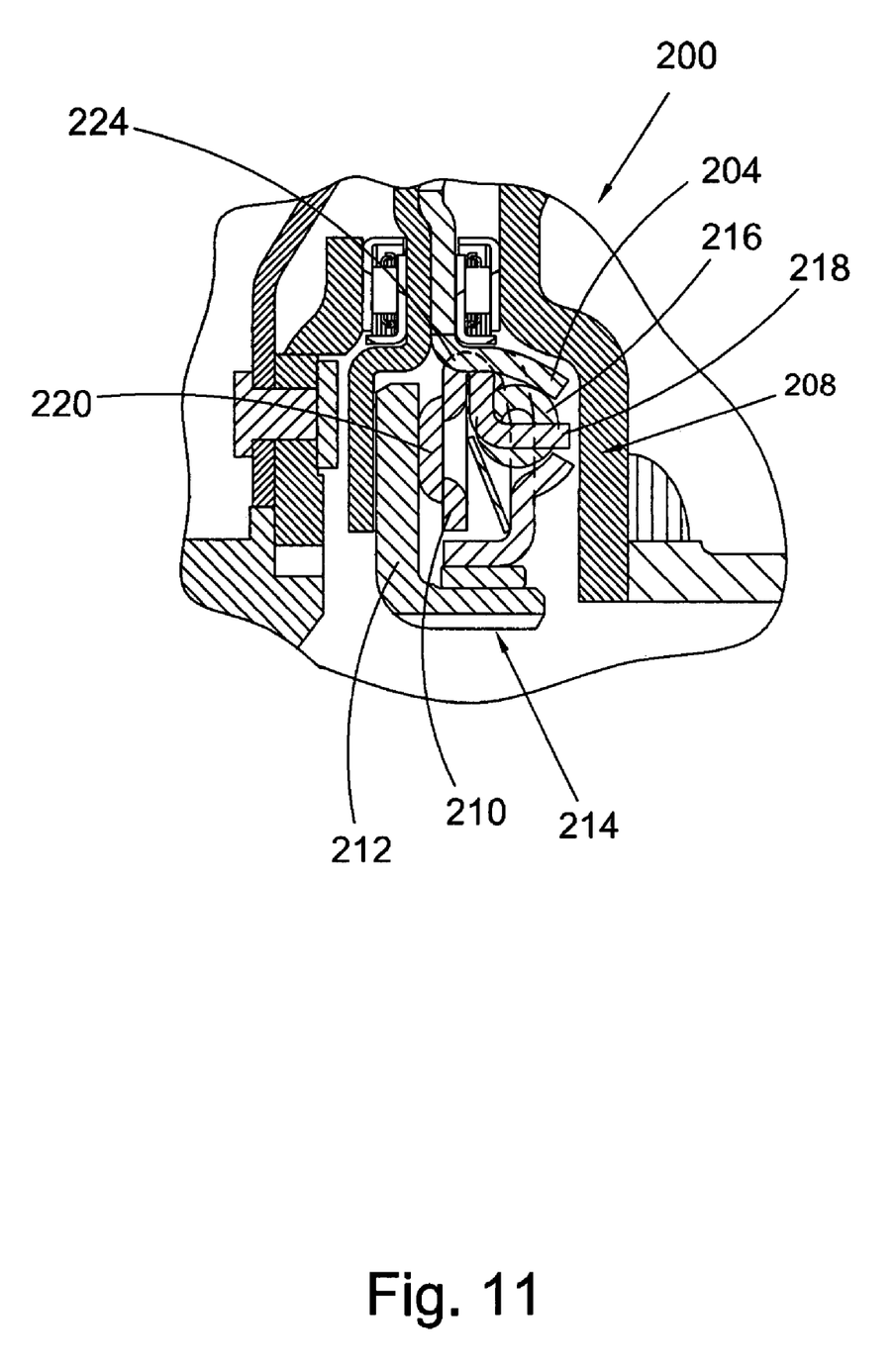
FIG. 11 is a cross-sectional view of a present invention stator and one-way clutch assembly, showing the clutch in a free-wheel mode; and, FIG. 12 is a partial cross-sectional view of the assembly shown in FIG. 11, showing the clutch in a locked mode.

FIG. 11 is a cross-sectional view of a present invention one-way clutch assembly, showing the clutch in a free-wheel mode.

Figure 12:
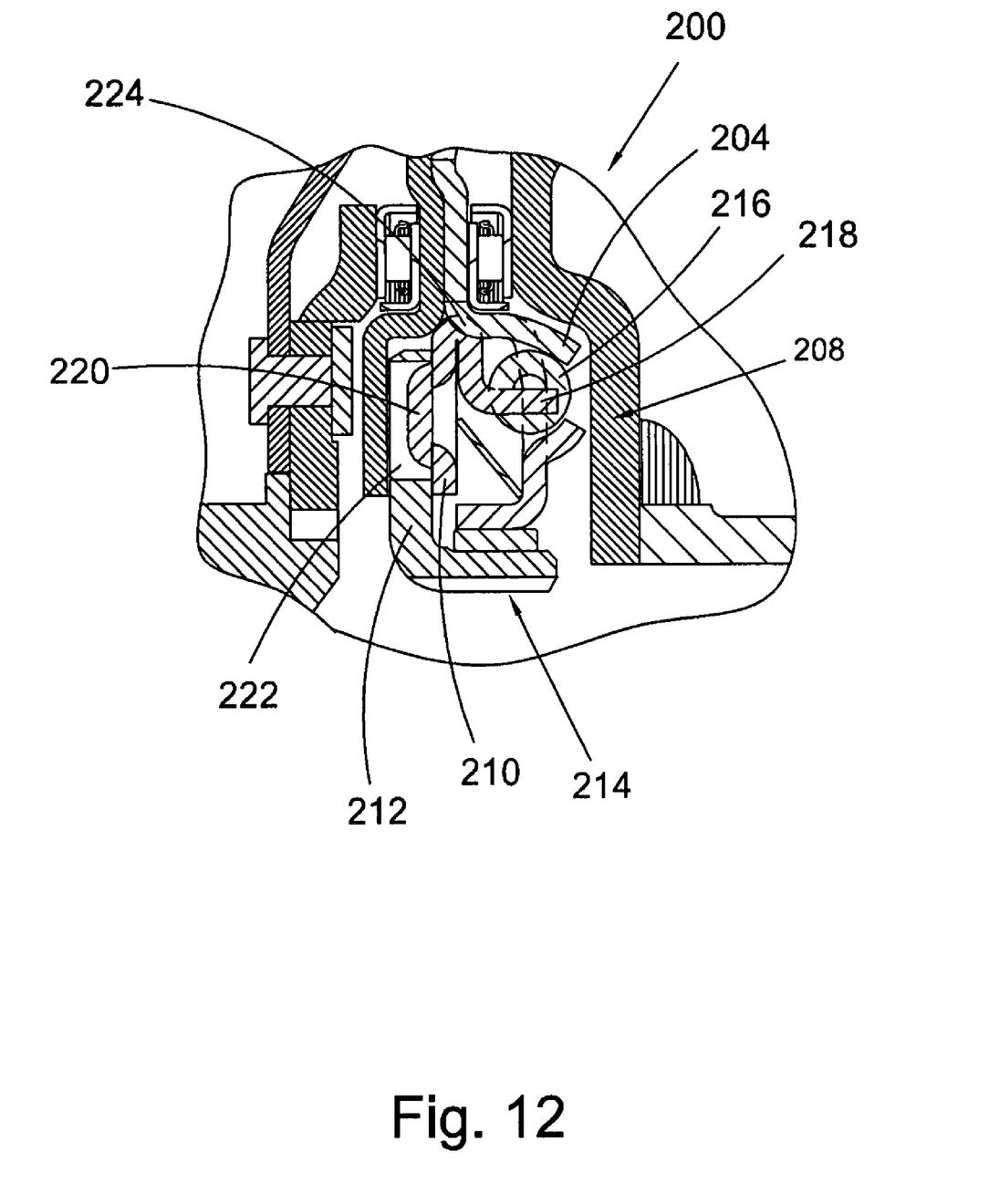

FIG. 12 is a cross-sectional view of the assembly shown in FIG. 11, showing the clutch in a locked mode. The following should be viewed in light of FIGS. 11 and 12. FIGS. 11 and 12 illustrate another aspect of the present invention. Stator and one-way clutch assembly 200 includes plate 204 connected to a stator, portions of which are shown. One-way clutch 208 includes plates 210 and 212. Plate 212 is connected to hub 214. In some aspects, plate 212 is integral to hub 214. Elastically deformable element 216, in some aspects, a spring, is retained in plate 204 and engaged with plates 204 and 210, in particular extension 218 of plate 210. Assembly 200 is not limited to any particular number, configuration, or type of element 216. In some aspects, element 216 is a cylinder made of compressible materials such as rubber.

The operation of assembly 200 is similar to that described supra for assembly 100 in FIGS. 1 through 10. For example, the rotation of plate 204 in a locked mode direction causes plate 204 to urge element 216 against plate 210. In FIGS. 11 and 12, this direction is out of the page. In particular, the elements push against extensions 218 of plate 210, causing plates 210 and 212 to rotationally lock. In some aspects, ramps 220 on plate 210 engage openings 222 in plate 212 to effect the locking. As described supra, the relatively small inertia associated with plate 210 and the dampening effect of element 216 minimize the impact and vibration associated with the locking. As plate 210 continues to rotate, element 216 continues to compress until segment 224 of plate 210 comes into direct contact with plate 204 in a manner similar to that described supra for edges 180 and 182 in FIGS. 1 through 10. As described supra, the dampening effect of an elastically deformable element, for example, element 216, minimizes the impact and vibration associated with this contact.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A stator and one-way clutch assembly, comprising:
    a segment of a stator including:
        a wall disposed orthogonal to an axis of rotation for the stator; and,
        at least one slot fully surrounded by the wall;
    a one-way clutch including:
        a hub;
        a first plate displaceable in a direction parallel to the axis of rotation and with at least one first protrusion at least partially disposed within the at least one slot; and,
        a second plate connected to the hub, wherein the second plate restrains the first plate in the direction parallel to the axis of rotation; and,
    at least one elastically deformable element engaged with said segment and said first plate and arranged to dampen transfer of torque from said stator to said clutch.

2. The assembly of claim 1 wherein said segment is rotatable to urge said at least one elastically deformable element against said first plate.

3. The assembly of claim 2 wherein said at least one elastically deformable element is deformable in response to said urging.

4. The assembly of claim 2 wherein said first plate is arranged to rotate in response to said urging.

5. The assembly of claim 4 wherein said segment is arranged to rotate at a first rate during said urging, said first plate is arranged to rotate at a second rate during said urging, and said first rate is greater than said second rate.

6. The assembly of claim 2 wherein said segment and said first plate are arranged to rotationally lock.

7. The assembly of claim 6 wherein said at least one elastically deformable element is arranged to be in a substantially constant state of deformation when said segment and first plate are locked.

8. The assembly of claim 6 wherein said first and second plates are operatively arranged to rotationally lock in response to said urging, and said segment and said first plate are arranged to rotationally lock following said locking of said first and second plates.

9. The assembly of claim 8 wherein said first plate comprises at least one second protrusion, said second plate comprises at least one receiving structure, and said at least one second protrusion and said at least one receiving structure are arranged to lockingly engage.

10. The assembly of claim 8 wherein said second plate comprises at least one second protrusion, said first plate comprises at least one receiving structure, and said at least one second protrusion and said at least one receiving structure are arranged to lockingly engage.

11. The assembly of claim 8 wherein said second plate is formed by stamping.

12. The assembly of claim 1 wherein said segment is arranged to transfer torque to said at least one elastically deformable element and said at least one elastically deformable element is arranged to transfer at least a portion of said torque to said first plate.

13. The assembly of claim 12 wherein said at least one elastically deformable element is arranged to transfer substantially all of said torque to said first plate.

14. The assembly of claim 1 wherein said segment retains said at least one elastically deformable element.

15. The assembly of claim 1 wherein said first plate retains said at least one elastically deformable element.

16. The assembly of claim 1 wherein said segment and said first plate are formed by stamping.

17. The assembly of claim 1 wherein said at least one elastically deformable element further comprises a component selected from the group consisting of a spring and a rubber cylinder.

18. A stator and one-way clutch assembly, comprising:
    a segment of a stator including:
        a wall disposed orthogonal to an axis of rotation for the stator; and,
        at least one first and second slots fully surrounded by the wall, the at least one second slot disposed radially outward from the at least one first slot;
        plate for a one-way clutch including at least one first and second protrusions at least partially disposed within the at least one first and second slots, respectively; and,
    at least one elastically deformable element at least partially disposed within the at least one first slot, engaged with the at least one first protrusion and arranged to dampen vibration associated with a rotational locking of said stator and clutch, wherein the wall blocks movement of the plate in a rotational direction about an axis of rotation for the stator.

19. A stator and one-way clutch assembly in a stator, comprising:
    a segment for a stator;
    a first portion of a one-way clutch;
    a second portion of said one-way clutch, said second portion connected to a hub for said stator;
    at least one elastically deformable element engaged with said segment and said first portion, wherein said segment is rotatable to urge said at least one elastically deformable element against said first portion, said at least one elastically deformable element is arranged to deform in response to said urging, said first portion is arranged to rotate in response to said urging, respective segments of said first and second portions are operatively arranged to directly engage each other and to rotationally lock due to the direct engagement in response to said urging, said segment and said first portion are arranged to rotationally lock following said locking of said first and second portions, and said at least one elastically deformable element is arranged to absorb a portion of the energy associated with said locking of said first and second portions, wherein the respective segments of said first and second portions are at least partially aligned with the at least one elastically deformable element in a direction parallel to an axis of rotation for the stator.

* * * * *